Patented Aug. 7, 1923.

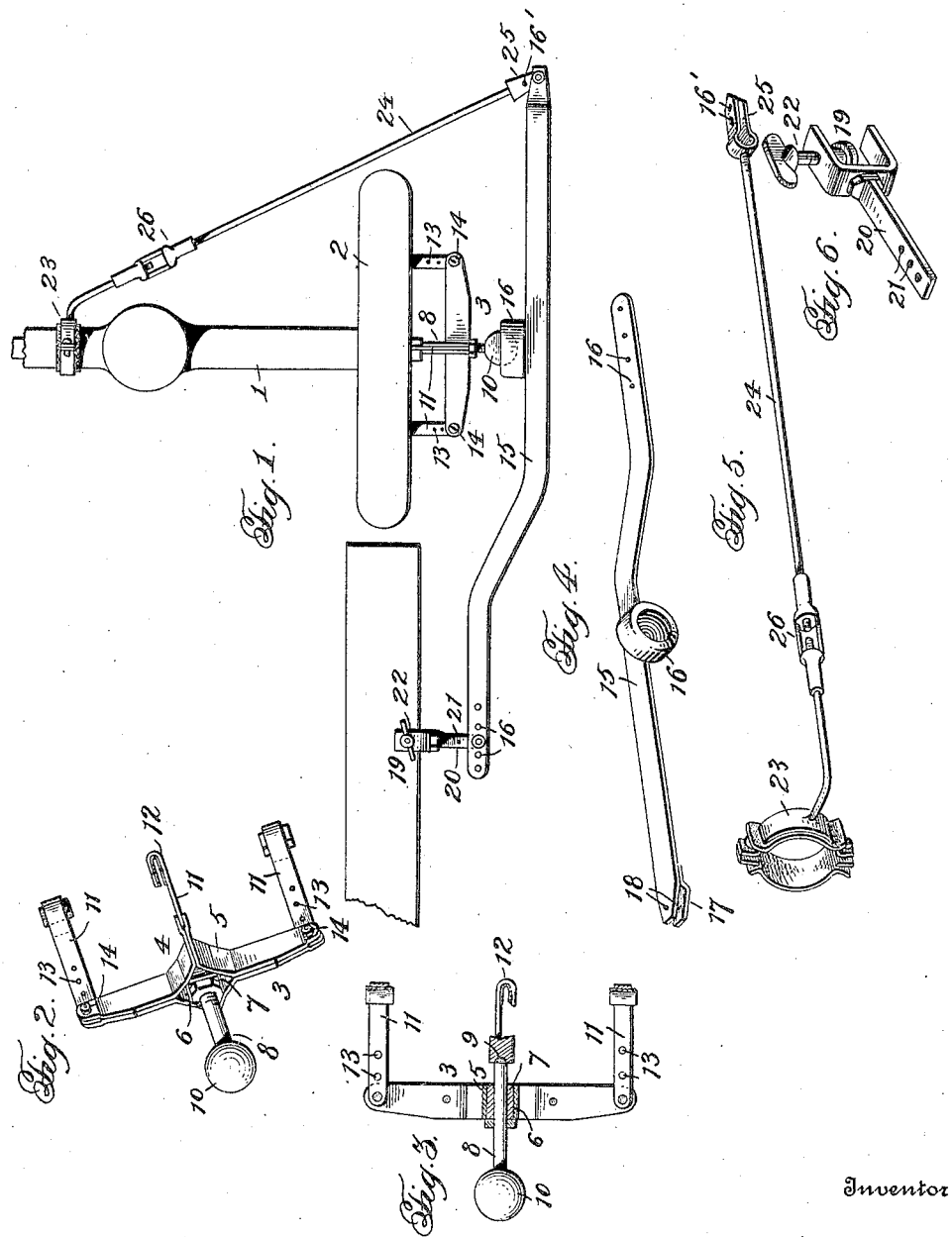

1,464,055

UNITED STATES PATENT OFFICE.

ALVA O. WRIGHT, OF NORTH SALEM, INDIANA.

EMERGENCY ATTACHMENT FOR AUTOMOBILE WHEELS.

Application filed September 20, 1919. Serial No. 325,079.

*To all whom it may concern:*

Be it known that I, ALVA O. WRIGHT, a citizen of the United States, residing at North Salem, in the county of Hendricks and State of Indiana, have invented certain new and useful Improvements in Emergency Attachments for Automobile Wheels, of which the following is a specification, reference being had therein to the accompanying drawing.

This invention relates to certain new and useful improvements in a temporary repair device applicable to the standard construction of a motor vehicle wheel in case of a broken axle.

The main object of the invention is the provision of a device which when in applied position on the vehicle, in case of a broken axle, temporarily maintains the broken parts in assembled relation, thereby permitting movement of the vehicle without the use of jacks or trucks.

Another object of the present invention resides in the novel and efficient manner of rendering temporary repairs to the rear axle of a motor vehicle in case of breakage while upon the road, thereby enabling the car to proceed under its own power to a garage or repair shop where permanent repairs may be made.

Other objects and aims of the invention more or less broad than those stated above, together with the advantages inherent, will be in part obvious and in part specifically referred to in the course of the following description of the elements, combinations, arrangement of parts, and applications of the principles constituting the invention, and the scope of the invention contemplated will appear from the claims.

In the accompanying drawings which are to be considered in connection with the following detail description, there is shown the preferred embodiment of the present invention, in which:—

Figure 1 is a perspective view of the rear end of a motor vehicle showing the device in applied position.

Fig. 2 is an enlarged perspective view of the wheel gripping member.

Fig. 3 is a cross sectional view through the wheel gripping member.

Fig. 4 is a perspective view of the main side bar.

Fig. 5 is a perspective view of the rear brace rod.

Fig. 6 is a perspective view of the connection at the forward end of the side bar.

Referring more in detail to the drawings, wherein similar letters of reference indicate like parts throughout the several views, 1 designates the usual or standard form of a rear axle housing for an automobile, in which the axles of the rear wheel 2 are enclosed. In case of breakage of either of the rear axles within the housing, the hub cap of the wheels 2 is removed to expose the lathe center of the axle. Securely fastened into position on the wheel is what I term a wheel gripping member generally designated at 3, Fig. 1. This wheel gripping member is more clearly illustrated in Figs. 2 and 3 and is composed of metallic strips or bars suitably secured together adjacent their other extremities and spaced from each other as at 4 to provide a central enlargement 5. As shown in the present case, two of such strip constructions are centrally interlocked in such a manner as to provide a centrally arranged rectangular chamber 6 into which a threaded tap 7 may be secured. Threadedly engaged in the tap 7 is a thrust member 8, the inner end of which is rounded as at 9, while on the outer end is mounted a ball or bearing member 10. Between the strips or bars at their outer ends are arranged spoke-engaging members 11, the ends of which are curved as at 12 and lined with chamois or felt or other soft material to prevent marring of the spokes when the device is applied to the wheel. The inner ends of these spoke-engaging members 11 are perforated as at 13 to allow for adjustment to suit various requirements. Removable fasteners indicated at 14 hold the spoke-engaging members in their desired adjusted position.

After the wheel gripping member is in applied position upon the wheel, the following structure is employed which co-acts with the gripping member to effectively hold the broken axle in position within the housing: A main side bar is employed, this bar being designated as at 15 and provided intermediate its forward and rear ends with a socketed member 16 within which the ball of the thrust member 9 is adapted to fit. The rear end of said bar 15 is provided with a plurality of apertures 16, while the forward end is bifurcated as at 17 and apertured as at 18. In order that the forward end of the bar 15 be effectually secured in position on the vehicle, there is provided, in the present case, a clamping member 19 from the rear face of which extends a strip or bar 20. This strip or bar 20 is provided with a plurality of apertures 21 and is adapted to fit between the bifurcation 17 on the main bar 15, being suitably secured in the desired adjusted position by fasteners 22. In the present case, the clamp is shown applied to the running-board of the vehicle, but it is to be understood that it may be secured at any convenient point in advance of the rear wheel.

Securely fastened to the axle housing 1 by means of a split clamping member 23 is a rear brace 24, the opposite end of which is bifurcated as shown at 25 to span and to be securely fastened through the desired aperture 16' to the main bar 15 by any suitable form of fastener. In order that this rear brace 24 may be lengthened or shortened to meet the various requirements, there is provided intermediate the ends thereof a turn buckle indicated at 26. As shown in the drawings, the split clamping member 23 is also lined with a soft material, such as chamois to prevent marring of the axle housing when the said member is clamped thereto.

It will, therefore, be readily appreciated that the present invention obviates the attachment of a supplemental spindle or auxiliary wheel in case of axle breakage while upon the road. By using this device the axle is positively held substantially in its intact position within the housing so as to allow the car to proceed under its own power to a place where the necessary repairs may be made.

What I claim is:

1. An emergency attachment for a broken axle of an automobile wheel, comprising a side bar suitably supported adjacent the outer end of the broken axle, and means carried by the wheel in alignment with and bearing against the axle and adapted to coact with said bar for maintaining the axle in position upon the automobile.

2. In an emergency attachment for a broken axle of an automobile wheel comprising a main side bar suitably supported in spaced relation to the outer end of the broken axle, and means supported upon the wheel of the automobile and bearing against the outer end of the axle, said means adapted to co-act with the main side bar and thereby prevent the outward movement of the axle.

3. An emergency attachment for a broken axle of an automobile wheel comprising a member carried by the wheel, said member having attached thereto a thrust bearing in alignment with and bearing against the exposed end of the axle, and means secured to the vehicle body and bearing against the outer end of the thrust bearing to prevent outward movement of the axle.

4. An emergency attachment for a broken axle of an automobile wheel comprising a member secured to the spokes of the wheel and having associated therewith a thrust bearing for engagement with the exposed end of the axle, and means connected to the vehicle body in spaced relation to the outer end of the broken axle and adapted to bear against the outer end of the thrust bearing.

5. An emergency attachment for a broken axle of an automobile wheel, comprising a side bar suitably supported adjacent the outer end of the broken axle, and means carried by the wheel in alignment with and bearing against the axle and having an enlarged head at the outer end thereof, said head adapted to coact with the said bar for maintaining the axle in position upon the automobile.

6. An emergency attachment for a broken axle of an automobile wheel, comprising a side bar suitably supported adjacent the outer end of the broken axle and having a bearing socket intermediate the ends thereof, and means carried by the wheel in alignment with and bearing in its inner end against the axle and adapted to coact at its outer end with the bearing socket in said bar for maintaining the axle in position upon the automobile.

7. An emergency attachment for a broken axle of an automobile wheel, comprising a side bar suitably supported in spaced relation to the outer end of the broken axle and having a bearing socket intermediate the ends thereof, and means carried by the wheel in alignment with and bearing in its inner end against the axle and having an enlarged head at the outer end thereof for coaction with said socket for maintaining the axle in position upon the automobile.

8. An emergency attachment for a broken axle of an automobile wheel, comprising a side bar, suitably supported in spaced relation to the outer end of the broken axle, and means interposed between said bar and the wheel and bearing at its inner end against the outer end of said axle and at its outer end against said side bar for maintaining the axle in position upon the automobile.

9. An emergency attachment for a broken axle of an automobile wheel, comprising a side bar suitably supported adjacent the outer end of the broken axle, and means secured to the spokes of the wheel and having centrally positioned therein a thrust member in alignment with and bearing against the outer end of the axle, said thrust member adapted to coact with said bar for maintaining the axle in position upon the automobile.

10. An emergency attachment for a broken axle of an automobile wheel, comprising a side bar suitably supported adjacent the outer end of the broken axle, means secured to the spokes of the wheel and having centrally positioned therein a thrust member in alignment with and bearing against the outer end of the axle, said thrust member having a balled head at its outer end, and a socket carried by the side bar for coaction with the balled head of the thrust member for maintaining the axle in position upon the automobile.

In testimony whereof I hereunto affix my signature in the presence of two witnesses.

ALVA O. WRIGHT.

Witnesses:
ALVAH A. PORTER,
R. F. DEAN.